Nov. 22, 1960     L. C. PHARO ET AL     2,960,866
SYSTEM FOR MEASURING THERMAL-GRADIENTS AND THE LIKE
Filed July 8, 1958                         2 Sheets-Sheet 1

LAWRENCE C. PHARO
CLINTON H. FITZGERALD
         INVENTOR.

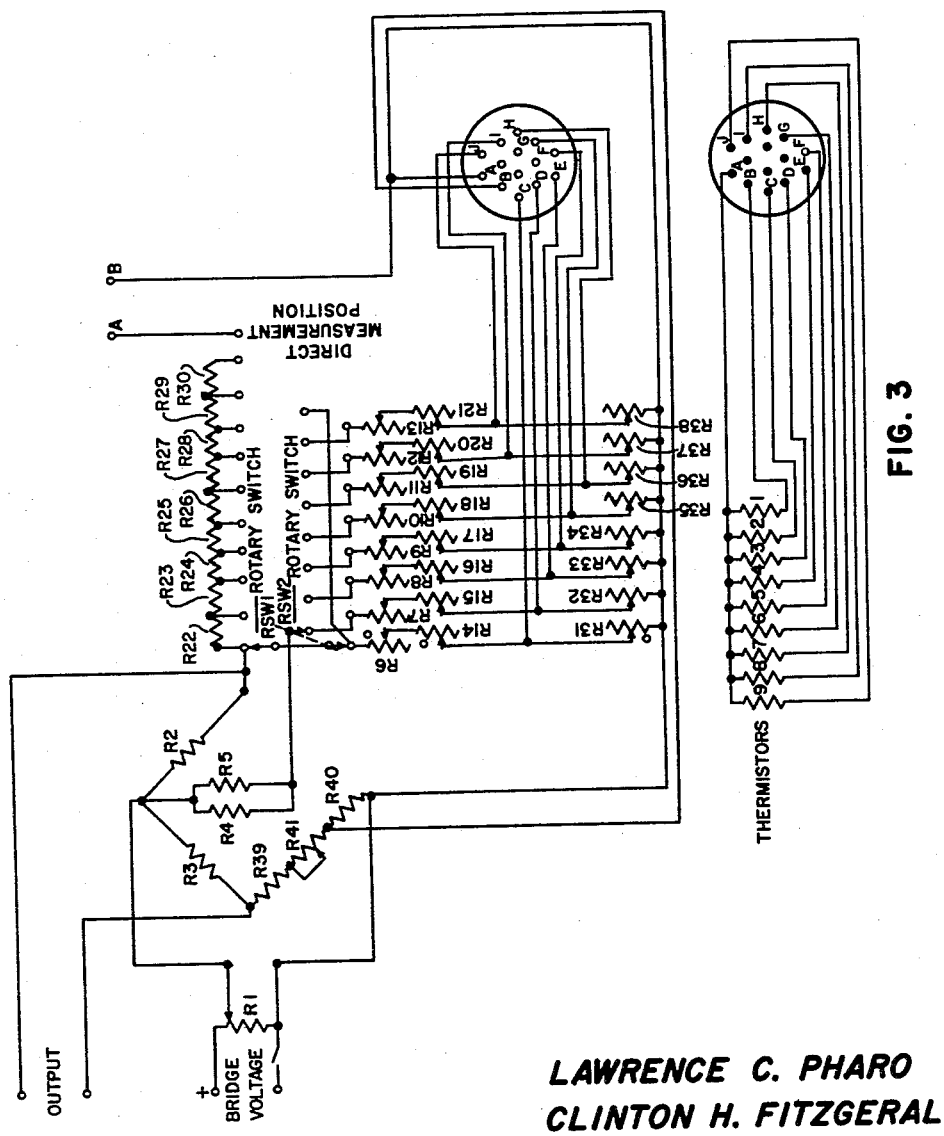

United States Patent Office 2,960,866
Patented Nov. 22, 1960

2,960,866

SYSTEM FOR MEASURING THERMAL-GRADIENTS AND THE LIKE

Lawrence C. Pharo, Pine Grove Mills, and Clinton H. Fitzgerald, State College, Pa., assignors, by mesne assignments, to the United States of America as represented by the Secretary of the Navy Filed July 8, 1958, Ser. No. 747,321

8 Claims. (Cl. 73—362)

This invention relates to systems or circuits in which temperature sensitive elements such as, for example, thermistors and the like are utilized for measurements to obtain an indication, a record, or a control.

It is well known that the variation in temperature of the cold junction of a thermal-electric couple necessarily varies the generated current in such a couple, thereby rendering the readings inexact or necessitating computations which will effect more or less accurately, the required correction of the actual readings. It is possible under laboratory conditions, of course, to avoid such computation, but in practice, the thermal-electric couple, while otherwise exceptionally well adapted for the measurement of high temperatures, has been discarded, except in the systems wherein an approximate indication of the temperature is satisfactory. Such systems are totally unsatisfactory for accurately measuring gradients in flowing fluids, gases, bodies of water, and the like.

Experimental investigations of large bodies of water quite often require accurate information with regard to thermal-gradients of, for example, .001 of a degree centigrade or less. A knowledge of such temperature fluctuations is of extreme importance for understanding the propagation of sound in the sea and its reverberation characteristics. Further, such information is of equal importance in certain chemical flow processes and the like wherein temperature gradients and the like must be accurately known for control purposes.

It is an object of the present invention to provide a measuring device for measuring gradients between two or more points.

It is another object of the present invention to provide an accurate measuring device utilizing thermistors and the like for measuring gradients.

Another object of the present invention is to provide means in combination with a series of thermistors to automatically compensate over the working range of the thermistors for the variation in thermistors and the effects of the temperature at which the measurements are made.

A still further purpose of the present invention is to permit thermistors having different characteristics to be used interchangeably with an electrical network with the assurance that temperature measurements will be correct throughout the working range.

A still further object of the present invention is to provide a temperature-measuring device for measuring temperature gradients whereby changes in temperature of as little as .001 of a degree centigrade may be accurately and easily measured at any temperature within the working range of the device.

These and other objects and features of the invention, together with their incident advantages, will be more readily understood and appreciated from the following detailed description of the preferred embodiment thereof selected for purposes of illustration and shown in the accompanying drawings, in which:

Figure 3 is a schematic representation of the bridge shown in block form in Figure 1.

Figure 1:
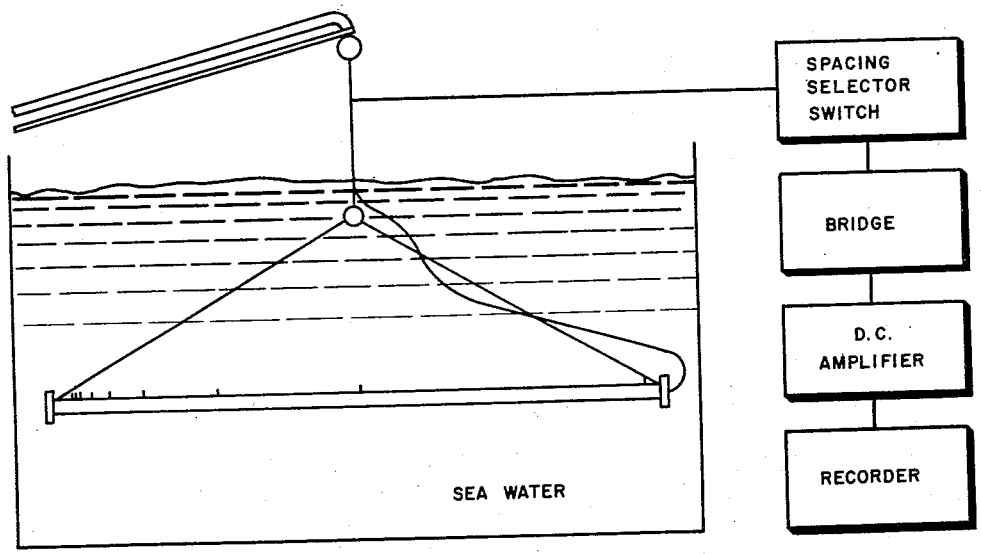
Figure 1 is a diagrammatic representation of one embodiment of the invention.

With reference now to Figure 1 there is shown a block diagram of the system used to determine the temperature structure of the sea at specified depths and in particular temperature differences of .001 of a degree over distances of 1 inch to the maximum desired distance of, for example, twelve feet or more. As shown in Figure 1, temperature sensitive elements are distributed over or along a pipe suspended at both ends to measure the temperature deviation between a temperature sensitive element, such as, for example, a thermistor at one end of the pipe, and any one of the balance of the temperature sensitive elements distributed along the rest of the pipe. A reference element forms a permanent arm in the D.C. bridge and the remaining elements are insertable in and removable from the bridge by a spacing selector switch. The output of the bridge, as more thoroughly described hereinafter, is amplified by a conventional D.C. amplifier and drives a conventional recording device or the like, as may be desired or appropriate.

The present invention contemplates the use of "thermistors" or temperature sensitive elements having comparable operating characteristics. As used herein the word "thermistor" means an element of the nature of a resistor having a large temperature coefficient of resistance.

Although well known in the art, present day thermistors, are, briefly, ceramic-like semi-conductors with unique electrical resistance characteristics that vary extensively with changes in temperature, the resistance decreasing tremendously as the temperature rises and increasing as the temperature falls. This characteristic is in direct contrast to the characteristic of ordinary resistors which normally have but a small positive temperature coefficient, their resistance increasing slightly as the temperature rises and decreasing as the temperature falls. Thermistors are practical for measurement of temperatures from very low to very high values and are generally used in electrical circuits whenever a thermally-sensitive variable resistor can be used for temperature measurement, control, or compensation.

Figure 2:
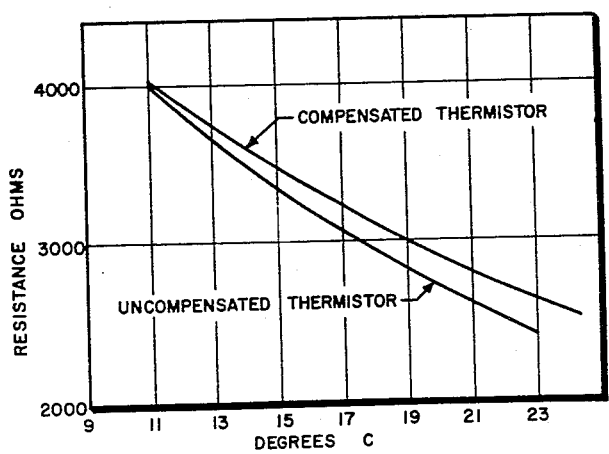
Figure 2 is a graphic representation of the resistance-temperature characteristic of a compensated thermistor and an uncompensated thermistor.

Typical and compensated curves of resistance, R, versus temperature, T, for commercially available thermistors are shown in Figure 2. We have found that both the resistance and the slope of the R—T curves of any two thermistors are so different that a change of less than one-half degree centigrade from an original balance of temperature will result in sufficient error to mask a desired thermal-signal. Therefore, since substantially no two thermistors have sufficiently identical characteristics, it is necessary to provide a method and means of balancing selectable thermistors against reference thermistor. A bridge network which includes a series-parallel network has been developed and is provided to compensate for the error in slope and displacement of each selectable thermistor. Such a compensating network is essential if the system is to operate at any temperature other than one at which the bridge is originally balanced. The thermistors may be selected by means of a rotary switch or the like which is of the make-before-break variety which keeps switching transients at a minimum level. Also incorporated in the bridge is a pre-warming circuit so devised that while a thermistor is being used to make a measurement, the next one to be selected for measurement may receive a current flow that is equal to what it will receive when it is operatively connected in the bridge network. By this means, within the time constant limit of the system, the newly selected thermistor will immediately indicate a thermal-gradient or the like.

For the measurement of temperature gradients, thermal-gradients or functions detectable by temperature changes, a reference thermistor or the like is compared in the bridge network with each of the other selectable thermistors, all of which must have substantially identical operating characteristics. Although no two thermistors have identical characteristics, we have discovered that they may be made so if a reference thermistor is selected having a lower slope and a higher resistance at a common temperature (see Figure 2) than any of the selectable thermistors. By reason of the aforementioned requirement, it is possible to modify the characteristics of the selectable thermistors to match those of the reference thermistor by the insertion of resistance in parallel with each thermistor to control and allow adjustment of slope and the insertion of resistance in series with each thermistor to control and allow adjustment of total resistance of each thermistor. In accordance with the teaching hereinabove, it may now be readily apparent that the characteristic curves of all thermistors may be made substantially identical and that where other temperature sensitive elements are used they may also be properly modified as and for the purpose described hereinabove. If it should happen that the thermistor most suitable for a reference thermistor should have the proper slope to allow adjustment of the selectable thermistors, but insufficient resistance, sufficient resistance need only be inserted in series to increase its resistance to a point above that of the highest resistance of the selectable thermistors and if desired or necessary, an additional resistance may be connected in parallel with the reference thermistor to decrease or further decrease its slope. Obviously, if a reference thermistor can be found having the necessary resistance and slope the series and parallel resistors referred to hereinabove may be omitted.

The thermistors when combined, as for example, as described hereinbelow, may be balanced in a simple and convenient manner. When the reference and selectable thermistors are electrically connected in the manner desired, or as the circumstances of their use may require, they may be combined and placed in a very nearly isothermal bath that is at a fixed temperature, or, preferably, at the approximate temperature of the medium to be measured and the resistance in series with each thermistor adjusted whereby the total series resistance of each selectable thermistor equals the total series resistance of the reference thermistor. The thermistors may then be shifted to another nearly isothermal bath at a different temperature of, for example, approximately ten degrees centigrade higher than the initial bath and the slope characteristics of each thermistor corrected to match the slope characteristic of the reference thermistor by means of adjustment of the resistor connected in parallel with each thermistor as described more thoroughly hereinafter. The combined thermistors may then be returned to the initial bath and the procedure described hereinabove repeated until the thermistors balance in both baths. If the above procedure is followed, it will be found that the selectable thermistors will track very well against the reference thermistor.

Where it is desirable to know a gradient or thermal-gradient between selected measuring points in portions of a degree, a calibration system may be provided that is usable under all service conditions. The simplest and most dependable method has been determined by use to be insertion of predetermined increments of resistance in one arm of the bridge and by use of a compensated R—T curve obtained in the manner described hereinbefore it is possible to compute in degrees centigrade, the corresponding thermal-shift for a known resistance change. In the event that the slope of the compensated thermistor curve is not the same for all values of temperature it is recommended that the sensitivity values be computed for the calibration resistance at the point on the compensated R—T curve corresponding to the temperature at which the measurements were or are to be made. If a thermal-gradient measurement is expected to be very narrow in temperature width, the line between the gradient excursion points may be considered straight, and, under this condition, the following equation may be used:

$$C = \text{Cal. } R \times \left(\frac{T_2 - T_1}{R_2 - R_1}\right)$$

where:

$C$=Apparent change in temperature in degrees centigrade, at the operating temperature, caused by insertion of the calibration resistance in the bridge;

$(T_2-T_1)$=Temperature differential; selected from chart or curve that brackets the known operating temperature;

$(R_2-R_1)$=Change in resistance in ohms as read from chart or curve that corresponds to $(T_2-T_1)$;

Cal. $R$=The value of resistance in ohms inserted into one arm of the bridge; the amount of which determines the desired sensitivity.

As is explained more thoroughly hereinafter, the provision of the selectable calibration resistors allows simple and accurate calibration of the recording means, the deviation of the recorder or display means due to the amount of resistance inserted and thereafter removed being directly proportional to the amount of resistance inserted and convertible to degrees centigrade. Likewise, it may now be readily evident that the deviation of the recorder thereafter resulting from actual temperature deviations are easily convertible to degrees centigrade by use of a scale and/or the formula given immediately hereinabove.

Also incorporated in the bridge is a pre-warming circuit that supplies a current to the thermistor next to be used that is equal to the current supplied to it when it is operatively connected in the bridge. In this manner, and within the time constant limit of the system, a newly selected thermistor will immediately and accurately provide an indication the instant it is operatively connected in the bridge. The thermistor selector switch which connects the selectable thermistors into the bridge and which simultaneously connects the next thermistor to a source of current as described hereinabove is preferably of the make-before-break variety to minimize switching transients.

With particular reference now to Figure 3 which shows the connections of the bridge network which includes the calibration circuit, reference thermistor, pre-warming circuit, and the series-parallel resistors for modifying the characteristics of the selectable thermistors referred to generally hereinbefore, there is shown a potentiometer R1 for varying the voltage applied to the bridge, thus allowing control of the output signal of the bridge. The bridge excitation voltage from potentiometer R1 is supplied across the bridge at the junction of the accurately-matched resistors R2—R3 that comprise the inactive arms of the bridge and the oppositely disposed bridge terminal, the output signal of the bridge being taken at the opposite terminals of resistors R2 and R3. The calibration circuit is comprised of series-connected resistors R22—R30, accurately calibrated in terms of degrees centigrade as described hereinbefore. Resistors R22–R30 are connected in series with each other or suitable taps may be provided if a single resistor is used, and are connected in series with resistors R2 and through switch RSW1 and RSW2 to the selectable thermistor selected by the lower contact (see Figure 3) of RSW1. In the operation of the device, the resistors R22—R30 are switched into the circuit to create a known resistance "unbalance". By noting the deflection caused by this known resistance at a particular temperature range, it is possible to determine accurately the quantity of resistance equivalent to a degree of temperature, at the temperature range used. By this method, very accurate temperature determinations are possible. The pre-warming circuit is comprised of resistors R4—R5 connected in parallel and disposed between the positive input terminal to the bridge and the pre-warming or upper section (see Figure 3) of switch RSW2 which connects a second selectable thermistor to be brought up to operating condition and temperature to the source of the current, resistors R4—R5 functioning to limit the current through the second thermistor being pre-warmed to the same value of current supplied to it when it is operably connected to the bridge. Switch RSW2 is of the rotary make-before-break variety whereby as different selectable thermistors are selected the current supplied thereto remains substantially the same and switching transients are kept to the lowest possible value or entirely eliminated.

It may now be readily appreciated that variable values of resistance are selectively insertable in series with resistor R2 by means of switch RSW1 and that switch RSW1 is connected in series with the lower contact of switch RSW2 which as clearly pointed out hereinafter allows selection of a selectable thermistor, and that the upper or pre-warming contact of RSW2 allows the next succeeding selectable thermistor to be placed in operative condition.

Potentiometers R6–R13 are respectively connectable in series with resistor R2 through the lower contact of switch RSW2 and to resistors R4—R5 through the upper contact of switch RSW2. Potentiometers R14–R21 are respectively connected in series with potentiometers R6–R13 and the selectable thermistors 2–9. Potentiometers R6–R13 are preferably adapted to respectively provide coarse adjustment of the total series resistance of each of the selectable thermistors and potentiometers R14–R21 to respectively provide a fine adjustment to allow accurate adjustment and balancing of the series resistance of the selectable thermistors. Potentiometers R31–R38 are respectively connected in parallel across each of the selectable thermistors 2–9 and allow adjustment of the slope of the R—T curves of the individual selectable thermistors to match the slope of the reference thermistor 1.

The only portion of the bridge that as yet has not been described in detail is the active leg of the bridge which contains the reference thermistor 1. This leg of the bridge is comprised of resistor R39, master balance control potentiometer R41 in series with the reference thermistor 1, and resistor R40 connected in parallel across the reference thermistor 1. Resistor R39 provides a suitable minimum series resistance for the reference thermistor and resistor R40 provides a suitable slope characteristic. Obviously, if a thermistor can be found having the necessary R—T curve as described hereinbefore resistors R39—R40 may be eliminated. Inasmuch as the thermal-gradient to be measured may be superimposed upon a larger thermal-gradient, it is necessary to provide a master balance control to balance out the effect of the large gradient and allow the system gain to be advanced sufficiently to record lesser or micro-thermal fluctuations. Potentiometer R41 performs this function and may, for example, be comprised of a 50 ohm, 10 turn heliopot.

Switch RSW1 when in the direct-measurement position allows direct measurement of the compensating network described hereinbefore. Unless the thermistors actually change in characteristics, it is also possible at any time, utilizing the direct-measurement position of the calibration switch, RSW1, to check the adjustment of the network variable resistors with a suitable Wheatstone bridge. This is necessary because the adjustment of the various resistors is, of necessity, critical, and shipment and handling of the equipment can alter the adjustments. Attention is also directed to the fact that this feature is highly convenient for measuring the resistance of the thermistor series circuit and that it provides a simple and accurate method and means for determining the temperature of the medium, which temperature is necessary for accurate calibration. When the switch RSW1 is in the direct-measurement position the series resistance of thermistor 2, for example, may be obtained and this value, when applied to the compensated R—T curve, will give the temperature of the medium being measured.

The preferred embodiment of the invention as described herein is accurate for measurements of as small as 0.001 degree centigrade and with a bridge-excitation voltage of about 4 volts, the heat dissipation of the thermistors is well within the limits required for predictable operation.

The output signal of the bridge is supplied to a conventional D.C. amplifier and recording means (see Figure 1) which may, for example, be comprised of a chopper-type D.C. amplifier cascaded ahead of a Brush Electronics Corporation D.C. amplifier and pen recorder. For such an arrangement the gain of the chopper D.C. amplifier may be maintained at 40 db and the gain of the brush amplifier varied according to calibration sensitivity.

Adjustment of the calibration switch RSW1 to the direct-measurement position allows the determination of the total network resistance at any thermistor position. This value, when applied against the compensated R—T curve, gives the temperature of the medium at any point. With the calibrate switch in its first or zero resistance position and the thermistor switch in the position which gives the greatest output signal, the recorder or display device may be energized and the amplifier gain adjusted for nominal excursion on the recorder or display device. The thermistor selector switch may now be returned to its first position which connects thermistor 2 in the bridge and with the recorder operating, the calibration switch should be rotated to insert resistance in series with the thermistor until the desirable amount of pen deflection or the like is obtained. The amount of resistance inserted, in conjunction with the value of the measured temperature, determines the sensitivity of the system as pointed out hereinbefore. After the calibration switch is returned to its zero or no-resistance position, the system is in condition for measurement of thermal-gradients as determined by the position of the thermistor selector switch RSW2.

It may now be apparent that the specific embodiment shown and described herein is highly suitable and accurate for measuring temperature, temperature-gradients, microthermal-gradients, and the like and that, without departing from the spirit and scope of the invention, it may be modified to measure gradients other than temperature gradients, turbulence and the like by using, for example, hot wire anemometers. The invention also greatly facilitates the determination of the correlation function for a great number of situations.

While the present invention has been described in its preferred embodiment, it is realized that modifications may be made and it is desired that it be understood that no limitations are intended other than may be imposed by the scope of the appended claims.

Having now disclosed our invention, what we claim as new and desire to secure by Letters Patent to the United States is:

1. A differential measuring system comprising: a Wheatstone bridge network having two inactive arms and first and second active arms; a plurality of elements having dissimilar response curves following substantially the same law of variation, one of said elements being connected in said first active arm and the remainder being connectable in said second active arm; means forming a part of said second active arm for adjusting the response curves of said elements connectable therewith to match the response curve of said element in said first active arm; and means for supplying to each element connectable in said second active arm prior to its connection in said second active arm, a current substantially equal to the current that flows through said element when it is connected in said second active arm.

2. A differential measuring system comprising: a Wheatstone bridge network having two inactive arms and first and second active arms; a plurality of elements having dissimilar response curves following substantially the same law of variation, one of said elements being connected in said first active arm and the remainder being connectable in said second active arm; means forming a part of said second active arm for adjusting the response curves of said elements connectable therewith to match the response curve of said element in said first active arm; means for removably connecting each of said other elements in said second active arm; and means for supplying to each element connectable in said second active arm prior to its connection in said second active arm, a current substantially equal to the current that flows through said element when it is connected in said second active arm.

3. A differential measuring system comprising: a Wheatstone bridge network having two inactive arms and first and second active arms; a plurality of elements having dissimilar response curves following substantially the same law of variation, one of said elements being connected in said first active arm and the remainder being connectable in said second active arm; means forming a part of said second active arm for adjusting the response curves of said elements connectable therewith to match the response curve of said element in said first active arm; means for selectably connecting said other elements in said second active arm; means insertable in said network for causing said network to be unbalanced; and means for supplying to each element connectable in said second active arm prior to its connection in said second active arm, a current substantially equal to the current that flows through said element when it is connected in said second active arm.

4. A system for measuring temperature differentials and the like comprising: a Wheatstone bridge network having an output signal and two inactive arms and first and second active arms; a plurality of elements each having an electrical resistance that varies with changes in temperature, one of said elements being connected in said first active arm and the remainder being individually connectable in said second active arm; means forming a part of said second active arm for individually adjusting the response curves of said elements connectable therewith to match the response curve of said element in said first active arm; means for calibrating said output signal in terms of temperature; and means for supplying to each element connectable in said second active arm prior to its connection in said active arm, a current substantially equal to the current that flows through said element when it is connected in said second active arm.

5. In an electrical system for measuring temperature differentials and the like the combination comprising: a Wheatstone bridge network having two inactive arms and first and second active arms; a plurality of thermistors having dissimilar response curves following substantially the same law of variation, one of said thermistors being connected in said first active arm; switching means for selectably connecting the remainder of said thermistors in said second active arm; means forming a part of said second active arm for individually adjusting the response curves of said thermistors connectable therewith to match the response curve of said thermistor in said first active arm whereby said bridge will provide an output signal proportional to a difference between the thermistor in said first arm and a thermistor in said second arm; a calibration circuit for calibrating said output signal in terms of temperature including means removably insertable in said bridge for unbalancing said bridge by a predetermined amount; and means for supplying to each thermistor connectable in said second active arm prior to its connection in said second active arm, a current substantially equal to the current that flows through said thermistor when it is connected in said second active arm.

6. In an electrical system for measuring temperature differentials the combination comprising: a Wheatstone bridge network having two inactive arms and first and second active arms; a plurality of thermistors having dissimilar response curves following substantially the same law of variation, one of said thermistors being connected in said first active arms; switching means for selectably connecting the remainder of said thermistors in said second active arm; means forming a part of said second active arm for individually adjusting the response curves of said thermistors connectable therewith to match the response curve of said thermistor in said first active arm whereby said bridge will provide an output signal proportional to a temperature difference between the thermistor in said first arm and a thermistor in said second arm; a calibration circuit for calibrating said output signal in terms of temperature including a resistor having at least one predetermined and selectable amount of resistance and switching means for removably inserting said resistor in said bridge to unbalance said bridge whereby an additional variation of said output signal results therefrom; and means for supplying to each thermistor connectable in said second active arm prior to its connection in said second active arm, a current substantially equal to the current that flows through said thermistor when it is connected in said second active arm.

7. In an electrical system for measuring temperature differentials the combination comprising: a Wheatstone bridge network having two inactive arms and first and second active arms; a plurality of thermistors each having an electrical resistance that varies extensively with changes in temperature, one of said thermistors being connected in said first active arms; switching means for selectably connecting the remainder of said thermistors in said second active arm; means forming a part of said second active arm for individually adjusting the response curves of said thermistors connectable therewith to match the response curve of said thermistor in said first active arm whereby said bridge will provide an output signal proportional to a temperature difference between the thermistor in said first arm and a thermistor in said second arm, said means comprising a resistor in series with each said connectable thermistor and a resistor in parallel with each said connectable thermistor; a calibration circuit for calibrating said output signal in terms of temperature including means removably insertable in said bridge for unbalancing said bridge by a predetermined amount; and means for supplying to each thermistor connectable in said second active arm prior to its connection in said second arm a current substantially equal to the current that flows through said thermistor when it is connected in said second active arm.

8. In an electrtical system for measuring temperature differentials and the like the combination comprising: a Wheatstone bridge network having two inactive arms and first and second active arms; a plurality of thermistors each having an electrical resistance that varies extensively with changes in temperature, one of said thermistors being connected in said first active arm; switching means for selectably connecting the remainder of said thermistors in said second active arm; means forming a part of said second active arm for individually adjusting the response curves of said thermistors connectable therewith to match the response curve of said thermistor in said first active arm whereby said bridge will provide an output signal proportional to a difference between the thermistor in said first arm and a thermistor in said second arm, said means comprising means for adjusting the series resistance of at least one of said connectable thermistors and means for adjusting the slope of the responsive curve of at least one of said connectable thermistors; a calibration circuit for calibrating said output signal in terms of temperature including means removably insertable in said bridge for unbalancing said bridge by a predetermined amount; and means for supplying each thermistor connectable in said second active arm prior to its connection in said second active arm, a current substantially equal to the current that flows through said thermistor when it is connected in said second active arm.

References Cited in the file of this patent

UNITED STATES PATENTS

| | | |
|---|---|---|
| 1,238,468 | Wilsey | Aug. 28, 1917 |
| 1,327,800 | Beighlee | Jan. 13, 1920 |
| 1,460,530 | Brown | July 3, 1923 |
| 2,135,513 | Holven | Nov. 8, 1938 |
| 2,271,975 | Hall | Feb. 3, 1942 |
| 2,800,018 | Philips et al. | July 23, 1957 |
| 2,941,153 | Merrill | June 14, 1960 |